Oct. 16, 1951  E. KINSELLA  2,571,257
SHAFT GLAND
Filed Feb. 6, 1947
FIG.1.
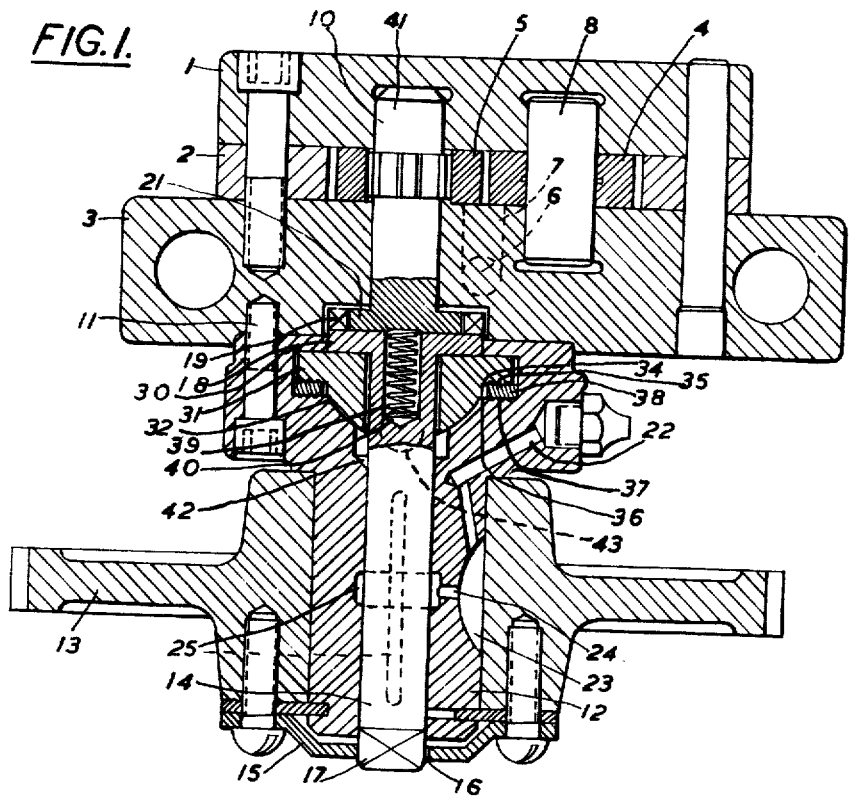
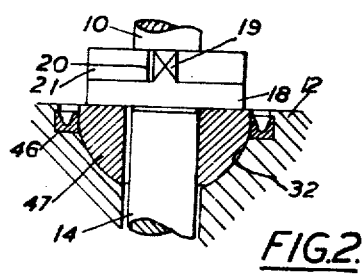
FIG.2.
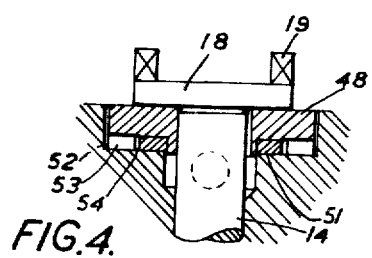
FIG.4.
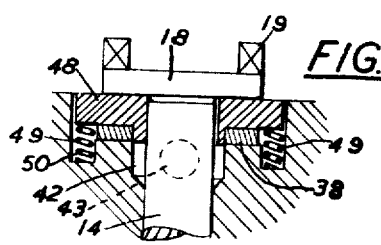
FIG.3.
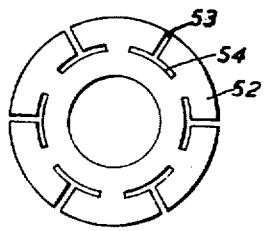
FIG.5.
Inventor
E. KINSELLA
By
Attorneys _Patented Oct. 16, 1951_

2,571,257

UNITED STATES PATENT OFFICE

2,571,257

SHAFT GLAND

Edward Kinsella, Spondon, near Derby, England, assignor to Celanese Corporation of America, a corporation of Delaware Application February 6, 1947, Serial No. 726,805
In Great Britain February 11, 1946

1 Claim. (Cl. 286—11.14)

This invention relates to shaft glands and is particularly, though not exclusively, concerned with the shaft glands of pumps especially for use in the spinning or extrusion of organic film-forming materials or solutions thereof to form continuous artificial filaments or like products.

In pumps used for this purpose it is a perennial difficulty to reduce to a minimum any leakage of the material handled by the pump through the passage by which the driving shaft of the pump extends from outside the pump to the high-pressure region inside the pump. It has been found that a particularly convenient form of gland for this purpose is an annular face gland, in which a wide flange or collar formed on the driving shaft engages on the face remote from the pump with a gland ring encircling the shaft, the gland ring in turn being spaced from a gland seat formed in the body of the pump by means of a resilient seating ring. When the gland is in good order the resilient seating ring keeps the working faces of the gland, i. e. the rear face of the flange and the face of the gland ring contacting therewith, in good contact with one another so that leakage between these surfaces is reduced to negligible proportions. This arrangement also permits the shaft to be broken on the pump side of the gland, the two parts being connected by a universal joint which permits slight deflection of the outer part of the shaft while the inner part, inside the pump, is unaffected. The deflection of the outer part of the shaft, which may be occasioned for example by slight irregularities in the driving forces applied to the pump, is taken by the resilience of the seating ring thereby allowing the working faces of the gland to remain in contact.

It has also been found, however, that, under very heavy fluid pressure, even this type of shaft gland is liable to leak slightly either between the working faces of the gland or between the seating ring and the gland ring or the gland seat. It is accordingly an object of the present invention to provide an improved shaft gland of the type generally described above in which this tendency to leakage under very heavy pressure is substantially reduced, the improved gland being particularly, though not exclusively, suitable for use in spinning pumps.

According to the present invention a shaft gland for sealing the passage by which a shaft extends from a region of low pressure to a region of high pressure comprises a flange on the shaft, a stationary gland seat surrounding the shaft, a gland ring encircling the shaft and having one face in working contact with a face of said flange, a resilient seating ring for spacing apart said gland ring and said gland seat, and means for transmitting the pressure on the high-pressure side of the gland to the gland seat such that the resilient sealing ring is subjected to a part only of said pressure. By these means, the resilient seating ring is relieved of a part of the fluid pressure and is less liable to be so heavily compressed as to lose its resilience. Consequently, it is the better able to act as an effective seal between the gland ring and the gland seat and to maintain the working surfaces of the gland, i. e. the contacting surfaces of the gland ring and of the flange on the shaft, in sealing contact with one another. As an additional precaution, leakage past the surfaces of the resilient seating ring itself can be reduced by having the seating ring cemented to and/or moulded to fit the gland ring and the gland seat.

In order to relieve the seating ring of part of the pressure within the pump several expedients are available. Thus, for example, the gland ring may itself engage the pump body in the neighbourhood of the shaft, the engaging surfaces being spherical in form so as to permit a slight rocking of the gland ring relatively to the pump body when the outer part of the shaft is slightly deflected. The resilient seating ring may then either be in the form of a flat washer carried between a flange of the gland ring extending beyond the spherical bearing surface thereof and a flat surface within the pump body, or it may be in the form of a ring of U section bearing on the inside against a cylindrical surface of the gland ring and on the outside against a cylindrical surface within the pump body. Alternatively the gland ring may extend outwards beyond a seating ring in the form of a flat washer, and may be engaged by a number of stiff springs housed in the pump body and of such length that they will only contact the gland ring after a predetermined load on the resilient seating washer has been reached. Or again, a flat seating washer of large area may be employed and the fluid pressure rendered ineffective over a substantial part of that area by slotting through the thickness of the washer over lines which form a broken circle concentric with the washer, each section of the circle being joined by a radial slot to the periphery of the washer. In this case it appears that the periphery of the washer, outside the broken circle, acts to relieve the pressure on the inner and continuous part of the washer which constitutes the seating ring.

By way of example, several forms of shaft gland in accordance with the present invention will now be described in greater detail, with reference to the accompanying drawings and in relation to their application to a pump for the spinning of artificial filaments. In the accompanying drawings:

Figure 1 is a sectional plan of a splining pump fitted with one form of shaft gland in accordance with the invention.

Figures 2 to 4 show three other forms of shaft gland suitable for use in substitution for that shown in Figure 1 and Figure 5 shows a detail of the gland shown in Figure 4.

The pump shown in Fig. 1 is a gear pump and comprises an outer side plate 1, a centre plate 2 and a driving side plate 3, a recess in the centre plate in the form of a double circle accommodating the two gears 4, 5 of the pump in the usual way. The driving side plate 3 has outlet and inlet ports 6 and passages 7 formed in it, the passages 7 communicating respectively with the points of first engagement and of disengagement of the pump gears 4, 5. The driven pump gear 4 is rotated on a fixed shaft 8, the ends of which fit into recesses in the side plates 1, 3 of the pump. The driving pump gear 5 is mounted on a short splined shaft 10, one end of which fits into a recess in the outer side plate 1 while the other extends through a bearing in the driving side plate 3.

Mounted on the driving side plate 3 by means of bolts 11 is a fixed trunnion 12 carrying the external driving gear 13 of the pump. This rotates a driving shaft 14 extending through the axis of the trunnion 12 by means of a yoke 15, which is attached at each end to the outer face of the main driving gear 13, extends over the end of the trunnion 12, and is slotted at 16 to receive the shaped end 17 of the driving shaft 14. On the inner end of the driving shaft 14 is a wide flange 18 having two projections 19 on the side towards the pump, which engage recesses 20 (Fig. 2) in a corresponding flange 21 on the splined shaft 10 carrying the driving pump gear 5. The two engaging flanges 18, 21 on the ends of the two shafts 14, 10 described above constitute a universal joint permitting slight play in the driving shaft 14 without affecting the alignment of the splined shaft 10. The shaft 14 and external gear 13 are lubricated through a passage 22 leading to an oil groove 23 outside the trunnion 12, the groove 23 communicating by a passage 24 to oil grooves 25 inside the bore of the trunnion.

The driving shaft seal is provided by the annular face of the flange 18 on the side remote from the pump, which face engages with the face 30 of an annular gland ring 31 surrounding the shaft 14. The other side of the gland ring 31 has a convex spherical surface engaging with a concave spherical surface in the trunnion part 12 of the pump body. Outside the spherical surface 32, the rear surface of the gland ring is flat at 34, except for three shallow annular grooves 35 concentric with the gland. Between the flat surface 34 of the rear face and a flat annular surface 36 within the pump body, similarly grooved at 37, is compressed a flat resilient washer 38 which is moulded to the form of the surfaces 34, 36 between which it is engaged so as to fit the surfaces and fill the annular grooves 35, 37 therein, and is cemented to those surfaces. The washer 38 constitutes the seating ring of the gland.

An axial spring 39 fitted in a recess 40 in the flanged end of the driving shaft 14 bears against the flanged end 21 of the splined shaft 10 so as to keep the whole gland compressed, even under conditions of zero pressure within the pump, the other end 41 of the shaft 10 then bearing against the bottom of the recess in the side plate 1. Behind the gland is a short recess 42 of larger diameter than the shaft 14 and a passage 43 leads downwards from the recess 42 to the outside of the pump in order that any small quantity of fluid passing through the gland may emerge.

The gland shown in Figure 2 is somewhat similar to that shown in Figure 1 except that the seating ring, shown at 46, is not a flat ring disposed between flat surfaces of the gland ring 47 and the trunnion body 12, but is a ring of U-section disposed between cylindrical surfaces of the gland ring 47 and trunnion 12. The whole of the pressure acting on the flange 18, therefore, is transmitted to the trunnion body 12 through the spherical surface 32, while the seating ring 46 is exposed only to the pressure acting within its U-section.

The gland shown in Figure 3 comprises a flat seating ring 38 similar to that described with reference to Figure 1. The gland ring 48 in this figure however, is not provided with a convex spherical surface but extends beyond the limits of the seating ring 38 and is engaged by springs 49 lodged in recesses 50 in the trunnion body 12. The springs 49 relieve the seating ring 38 of a substantial part of the pressure within the pump.

In the form of gland shown in Figures 4 and 5 the gland ring 48 is similar to that described with reference to Figure 3. The seating ring, however, is of the form shown in Figure 5 and comprises an unbroken inner annulus 51 and an outer annulus 52 which is broken by channels 53 and largely separated from the inner annulus 51 by circumferential channels 54. Thus the inner annulus 51 acts as the resilient seating proper, which is relieved of the major part of the pressure to which the gland is subjected by the outer annulus 52. Any slight rocking of the gland ring 48 acts chiefly to compress the outer ring 52, while the inner ring is only slightly affected and not sufficiently to lose it resilience.

While the invention has been described mainly in connection with a pump for the spinning of artificial filaments or the like, it is not restricted thereto but may be applied generally to pumps in which the driving shaft enters the pressure zone of the pump, so that a leak-resisting pressure gland is required. Indeed, the invention may be applied even more widely to other forms of apparatus in which a rotatable shaft passes from a region of high pressure to a region of low pressure, for the purpose of sealing the passage of the shaft.

Having described my invention, what I desire to secure by Letters Patent is:

A shaft gland for sealing the passage by which a shaft extends from a region of low pressure to a region of high pressure, said gland comprising a flange on the shaft, a stationary gland seat surrounding the shaft and having a flat annular face extending radially outwardly from a concave part-spherical surface, a non-rotating gland ring encircling the shaft and having on one side a working face in contact with a working face of said flange and on the other a flat annular face extending radially outwardly from a convex part-spherical surface fitting into and contacting said concave part-spherical surface, and a flat resilient washer cemented to and compressed between the flat annular faces of said gland seat and said gland ring for sealing the space between said annular faces, said gland seat having integral therewith an annular housing extending past said resilient washer for restraining the outer edge of said resilient washer, part of the pressure force between said working faces being transmitted directly through said gland ring and said spherical surfaces to said gland seat so that said resilient washer is subjected to a pressure force smaller than that between said working faces.

EDWARD KINSELLA.

REFERENCES CITED

The following references are of record in the file of this patent:

UNITED STATES PATENTS

| Number | Name | Date |
| --- | --- | --- |
| 464,332 | Monroe | Dec. 1, 1891 |
| 1,897,937 | Joyce | Feb. 14, 1933 |
| 1,953,383 | Albertson | Apr. 3, 1934 |
| 1,955,860 | Peters | Apr. 24, 1934 |
| 2,037,144 | Olson | Apr. 14, 1936 |
| 2,100,470 | Cotton | Nov. 30, 1937 |
| 2,189,685 | Stevenson | Feb. 6, 1940 |
| 2,301,654 | Yauch | Nov. 10, 1942 |
| 2,264,739 | Boden | Dec. 3, 1943 |

Certificate of Correction

Patent No. 2,571,257                                             October 16, 1951

EDWARD KINSELLA

It is hereby certified that error appears in the printed specification of the above numbered patent requiring correction as follows:

Column 2, line 6, for "sealing" read *seating*; column 3, line 8, for "splining" read *spinning*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*